United States Patent [19]

Hayes, Jr. et al.

[11] Patent Number: 5,382,151

[45] Date of Patent: Jan. 17, 1995

[54] TOOL FOR COLD FORM FLARING TUBING ENDS

[76] Inventors: Frank F. Hayes, Jr., 11620 Warner Ave., #621, Fountain Valley, Calif. 92708; Kent A. Rianda, P.O. Box 1734, Mammoth Lakes, Calif. 93546

[21] Appl. No.: 217,011

[22] Filed: Mar. 23, 1994

Related U.S. Application Data

[63] Continuation of Ser. No. 123,698, Sep. 17, 1993, abandoned, which is a continuation of Ser. No. 885,957, May 19, 1992, abandoned.

[51] Int. Cl.$^6$ .............. B25B 7/12; B29C 55/24; B21D 41/02
[52] U.S. Cl. .................. 425/392; 72/392; 72/409; 81/302; 264/291
[58] Field of Search ............ 425/12, 392, 393; 72/392, 409; 81/300, 302; 264/291

[56] References Cited

U.S. PATENT DOCUMENTS

| | | | |
|---|---|---|---|
| 544,268 | 8/1895 | Unsinger et al. | 81/302 |
| 1,320,547 | 11/1919 | Happensack | 72/392 |
| 2,222,744 | 11/1940 | Gallien, Jr. | 72/392 |
| 2,324,468 | 7/1943 | Brickman | 72/392 |
| 2,411,733 | 11/1946 | Kemmerlin | 72/392 |
| 2,618,184 | 11/1952 | Goedhart | 72/392 |
| 2,650,735 | 9/1953 | Redmond | 72/392 |
| 2,769,358 | 11/1956 | Hill | 72/392 |
| 3,171,676 | 3/1965 | Horn | 72/392 |
| 3,233,313 | 2/1966 | Roth | 81/302 |
| 4,155,242 | 5/1979 | Peterson | 72/392 |
| 4,331,183 | 5/1982 | Calhoun | 72/409 |
| 4,787,838 | 11/1988 | Doyle | 425/393 |
| 4,888,975 | 12/1989 | Soward et al. | 72/392 |
| 4,934,171 | 6/1990 | Konetzke, Jr. | 72/409 |

Primary Examiner—Jay H. Woo
Assistant Examiner—Joseph Leyson
Attorney, Agent, or Firm—Roberts and Quiogue

[57] ABSTRACT

A cold form flaring tool that includes first and second mandrel tips each having the shape of a half conical frustum that includes a base with a base radius and a narrow end with a radius that is less than the base radius. The first and second mandrel tips together form a conical frustum when in a closed position and are insertable in a tubing end when in the closed position. The first and second mandrel tips are expanded outwardly away from each other by pivotally interconnected levers which support the mandrel tips in such a manner that the respective narrow ends of the mandrel tips move outwardly at a greater rate than their respective bases, which retains the mandrel tips in the tubing end while being expanded.

1 Claim, 2 Drawing Sheets

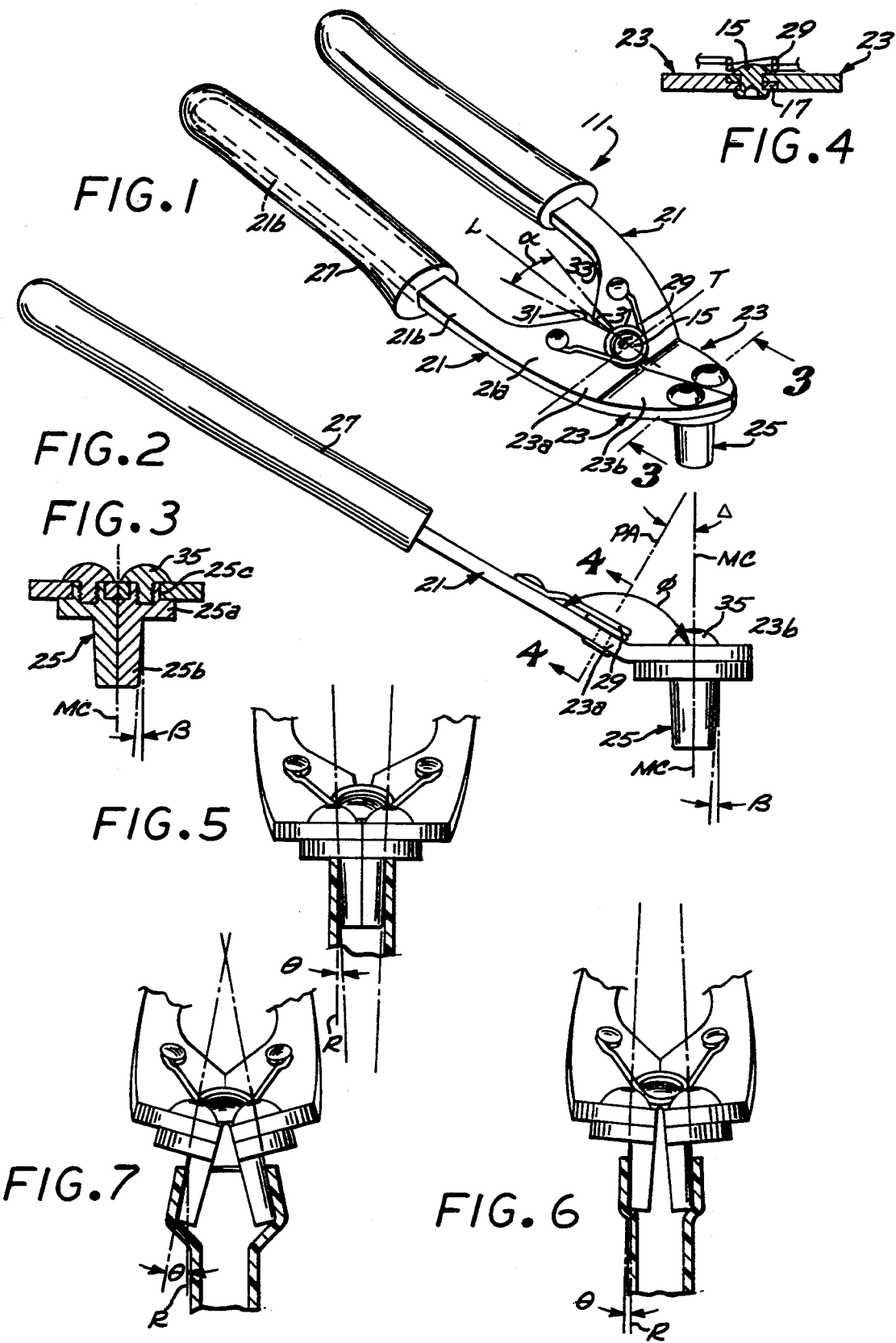

TOOL FOR COLD FORM FLARING TUBING ENDS

This is a continuation of copending application Ser. No. 08/123,698 filed on Sep. 17, 1993, now abandoned. Which is a continuation of copending application Ser. No. 07/885,957 filed on May 19, 1992, now abandoned.

BACKGROUND OF THE INVENTION

The disclosed invention relates generally to apparatus for flaring plastic tubing ends, and more particularly to a cold form flaring tool that does not utilize heat.

Plastic tubing is utilized in various applications such as ultra pure chemical dispensing systems and deionized water systems.

Sections of plastic tubing are commonly interconnected with fittings that are inserted into flared tubing ends. Known tubing end flaring techniques typically involve heating the tubing end, forcing the tubing end onto a flaring mandrel, and then cooling the flared tubing end.

A consideration with known techniques for flaring tubing ends is the length of time required to flare a tubing end, for example on the order of 3 to 5 minutes, which limits productivity.

A further consideration with known techniques for flaring tubing ends is the necessity of a heat source, which requires a source of energy that needs to be transported to the work site, set up, and then removed. Moreover, in certain environments, devices which produce heat or which can potentially produce mechanical sparks or other sources of ignition are not permitted for safety reasons.

Another consideration with known techniques for flaring tubing ends is the common use of some form of cooling of the flared tubing end, such as water or cool air from an air source, which requires equipment in addition to the heat source. Further, the use of water provides the possibility for contamination of the tubing, and may be inappropriate in some applications.

SUMMARY OF THE INVENTION

It would therefore be an advantage to provide a flaring tool for flaring tubing ends that does not require a heat source.

Another advantage would be to provide a flaring tool for flaring tubing ends that does not require a heat source and provides for increased productivity.

The foregoing and other advantages are provided by the invention in a cold form flaring tool that includes first and second mandrel tips each having the shape of a half conical frustum including a base radius and a narrow end with a narrow end radius that is less than the base radius. The first and second mandrel tips together form a conical frustum when in a closed position and are insertable in a tubing end when in the closed position. The first and second mandrel tips are expanded outwardly away from each other by pivotally interconnected levers which support the mandrel tips in such a manner that the respective narrow ends of the mandrel tips move outwardly at a greater rate than their respective bases, which retains the expanding mandrel tips in the tubing end.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic perspective view of a cold form flaring tool in accordance with the invention.

FIG. 2 is an elevational view of the flaring tool of FIG. 1 showing the angular offset of the mandrel tips of the tool.

FIG. 3 is a sectional view illustrating the attachment of half mandrels to the jaws of the flaring tool of FIG. 1.

FIG. 4 is a sectional view illustrating the pivot joint of the flaring tool of FIG. 1.

FIG. 5 is an elevational view showing the jaws of the flaring tool of FIG. 1 in its closed position.

FIG. 6 is an elevational view showing the jaws of the flaring tool of FIG. 1 in a partially expanded position.

FIG. 7 is an elevational view showing the jaws of the flaring tool of FIG. 1 in a fully expanded position.

DETAILED DESCRIPTION OF THE DISCLOSURE

Figure 8:
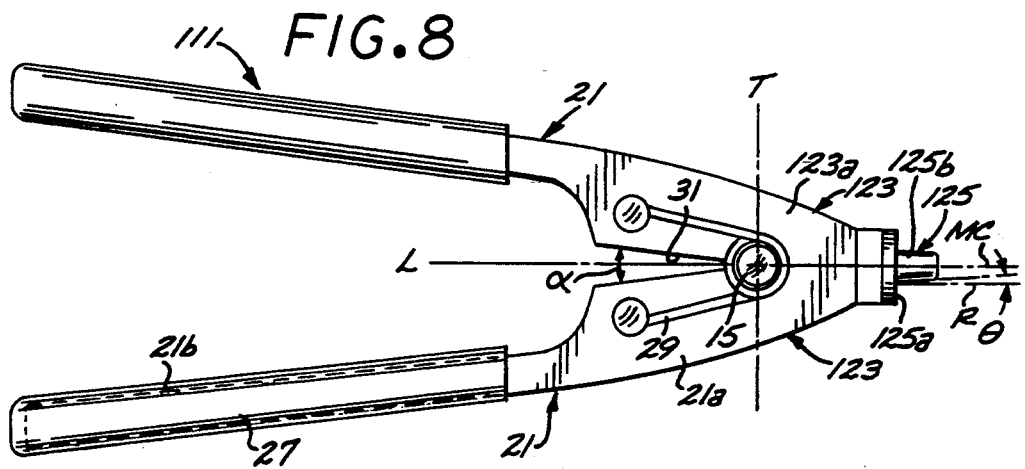
FIG. 8 is plan view of a further cold form flaring tool in accordance with the invention.

In the following detailed description and in the several figures of the drawing, like elements are identified with like reference numerals.

Referring now to FIGS. 1-4, set forth therein are schematic views illustrating a cold form flaring tool in accordance with the invention for flaring the ends of thermoplastic tubing. The cold form flaring tool includes first and second levers 11 that are pivotally interconnected by a pivot fastener 15 which passes through apertures formed in overlapping joining projections 17 formed on the inside edges of the first and second levers, as more particularly shown in FIG. 4. The joining projection of each lever 11 is one-half the thickness of the remaining portion of the lever 11, such that the levers 11 are even with each other. Apart from the joining projections, the levers are mirror images of each other across the longitudinal axis L of the tool and pivot about a pivot axis PA. By way of illustrative example, the levers 11 can be made of stamped stainless steel.

The levers 11 include flat handles 21 that extend in one direction from the transverse axis T of the tool which intersects the longitudinal axis L at the pivot fastener 15, and jaws 23 that extend in the other direction from the transverse axis T. Displacement of the handles 21 toward each other causes the jaws 23 to move apart, in a manner similar to a reverse opening plier. The handles 21 include relatively wide base sections 21a adjacent the pivot fastener 15 and elongated grip sections 21b that extend generally longitudinally from the outside of the base sections 21a and are covered by cushioned grips 27. The base sections 21a of the handles include linear inside edges 31 which extend from the pivot fastener 15 and diverge from each other with distance from the pivot fastener 15 when the tool is closed with the jaws 23 closed, as shown in FIG. 1, so as to form an angle α. Arcuate inside edges 33 extend from the ends of the linear inside edges to the inside edges of the grip sections 21b. The base sections 21a further include arcuate outside edges that diverge outwardly with distance from the pivot fastener 15 and join the outside edges of the grip sections 21b.

The amount of separation between the grip sections 21b is selected so as to provide a firm and comfortable grip for actuation of the tool by squeezing the grip sections 21b toward each other. The amount of pivotal movement between the handle sections 21 is limited by the angle $\alpha$ of the inside edges 31 which thereby provide for a measured stroke. The angle $\alpha$ will vary for different tubing sizes, and specific examples will be described further herein. A torsional spring 29 has its ends secured to respective base sections 21a, and functions to close the tool such that the jaws 23 are closed and the inside edges 31 of the base sections 21a are at the angle $\alpha$.

The jaws 23 include flat proximal sections 23a that are coplanar with the handle base sections 21b. Angled flat mandrel supporting sections 23b extend longitudinally from the proximal sections 23a at an obtuse included angle $\phi$, with the intersection of the proximal sections and the angled sections extending along the transverse axis T. The outside edges of the jaws 23 curve inwardly with distance from the transverse axis to a rounded end. By way of illustrative example, the obtuse angle $\phi$ formed by the proximal jaw sections 23a and the angled jaw sections 23b is about 150 degrees.

A pair of half mandrels 25 forming a split expanding mandrel are secured to the faces of the angled jaw sections 23b that are at more than 180 degrees relative to the adjacent faces of the proximal jaw sections 23a. The half mandrels 25 are mirror images of each other about a plane that includes the longitudinal axis L of the tool, and each includes a flat half cylindrical shoulder 25a disposed against the corresponding angled jaw section 23b, a mandrel tip 25b comprising a half conical frustum extending away from the corresponding angled jaw section 23b, and a locating dowel 25c positioned in a locating aperture in the corresponding angled jaw section 23b. The half mandrels 25 are secured to the angled jaw sections 23b by buttonhead screws 35 which are engaged in the locating dowels 25c from the face of the angled jaw sections 23b that is opposite the face that supports the mandrel shoulders 25a. By way of illustrative example, the locating dowels 25c and the dowel containing apertures in the angled jaw sections 23b are semi-circular in cross section, so as to prevent the half mandrels 25 from rotating relative to the angled jaw sections 23b.

The maximum radius of each mandrel tip 25b is at its base that is adjacent a corresponding shoulder 25a, while the minimum radius of each mandrel tip is near the end or apex of the tip, which can be radiused. The outside surface of each mandrel tip 25b forms an angle $\beta$ relative to the sides of a right cylinder having a radius equal to the maximum radius of the mandrel tip, and the closed mandrel tips 25b form a conical frustum and have a centerline MC that forms an acute angle $\Delta$ with pivot axis PA, wherein the bases of the mandrel tips 25b are closest to the vertex of the acute angle $\Delta$.

The flaring tool operates on a tubing end as follows. With the tool closed, the mandrel tips are inserted in a tubing end 37, as shown in FIG. 5. The tool is then expanded by pivotally displacing the grip sections 21b toward each other, and the mandrel tips 25b move outwardly from the longitudinal axis of the tool. As a result of the half mandrels 25 being secured to the angled jaw sections 23b, the ends of the tips 25b move outwardly at a greater rate than the bases of the tips adjacent the shoulders 25a. Thus, as the tool expands, each of the furthest apart or distal surfaces of the mandrel tips changes its angle $\theta$ relative to a reference line R that is parallel to the centerline of the mandrel tips 25b and passes through the intersection of the mandrel tip base and the mandrel shoulder. In particular, each distal surface moves from one side of the reference line R to the other side of the reference line R. If the angle $\theta$ is considered positive when the distal surface is between the centerline MC of the half mandrels and the reference line, expansion of the mandrel tips 25b causes the angle $\theta$ to become zero (distal surface is parallel to the reference line R), and then negative wherein the distal surface is on the side of the reference line R away from the centerline of the half mandrels, as shown in FIGS. 6 and 7.

Viewed another way, when the tool is unexpanded, the distal surfaces of the mandrel tips 25b converge toward each other in the direction away from the mandrel shoulder 25a, as shown in FIG. 5. As the tool is expanded, the distal surfaces of the mandrel tips change from converging to diverging, in the direction away from the mandrel shoulder, as shown in FIGS. 6 and 7.

The diverging expansion of the mandrel tips, wherein the tip ends move outwardly at a greater rate that the tip bases, causes the formation of outwardly extending recesses on the inside wall of the tubing, which retain the mandrel tips in the tubing as the tool is further expanded to expand the tubing end, although the tubing will move slightly off the mandrel shoulders, as shown in FIGS. 6 and 7. Essentially, the mandrel tips grip the inside wall of the tubing as they are expanded, which prevents the mandrel tips from being squeezed out of the tubing end by the resistance of the tubing walls to the expanding forces being applied by the mandrel tips.

In use, the mandrel tips 25b are inserted in the tubing end with the terminal edge of the tubing against the mandrel shoulders, as shown in FIG. 5. The tool is partially expanded pursuant to light pressure on the handle grips to expand the tubing end into a generally oval shape, and then closed. The tubing is rotated slightly and pushed against the mandrel shoulders, and the tool is again partially expanded to expand the tubing into a generally oval shape and then closed. This process of tubing rotation, tool expansion, and tool closure is repeated with progressively increasing pressure until the tool can be fully expanded, at which time the flare is complete. The taper of the mandrel tips 25b, as defined by the angle $\beta$, prevents overflaring of the tubing end.

The foregoing illustrative example of a cold form flaring tool in accordance with the invention is advantageously utilized with thermoplastic tubing including perfluoroalkoxy (PFA) fluorocarbon tubing, for which the mandrels 25 are coated with a fluoropolymer resin to prevent the possible migration of metallic ions from stainless steel half mandrels onto the tubing during the flaring process, and also to prevent scratching the inner wall of the tubing. By way of illustrative examples, set forth below are specifications for flaring tools in accordance with the invention for use with PFA tubing of different outer diameter (O.D.) tubing sizes, wherein:

D1 is the dimension in inches of the inside edges of the proximal sections as measured from the center of the pivot fastener;

D2 is the dimension in inches of the angled sections from their intersection with the proximal sections to the center axis of the mandrel tips;

D3 is the length in inches of the mandrel tips 25b as measured from the mandrel shoulders 25a;

α is the angle in degrees between the inside edges 31 of the handle base sections 21a with the tool in the closed position; and β is the angle degrees between the outside surface of each of the mandrel tips and a right cylinder having a radius equal to the radius of the tips 25b adjacent the shoulders.

D1: 11/32
D2: 19/32

| O. D. | D3 | α | β |
|---|---|---|---|
| 1/4 | 1/2 | 2° | 14.0 ± .25 |
| 3/8 | 9/16 | 1° | 18.0 ± .25 |
| 1/2 | 19/32 | 2° | 19.5 ± .25 |
| 3/4 | 41/64 | 1.5° | 21.0 ± .25 |
| 1 | 11/16 | 1.25° | 28.0 ± .25 |

The ends of mandrel tips implemented in accordance with the foregoing can be radiused in the amount of 3/32 inches, and levers can comprise stamped stainless steel having a thickness of about 3/16 inches.

Figure 9:
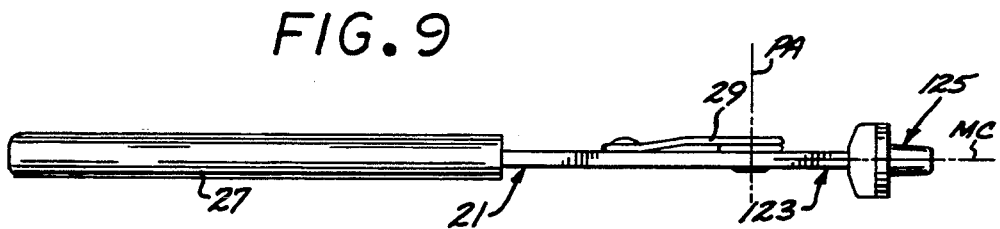
FIG. 9 is an elevational view of the cold form flaring tool of FIG. 8.

Referring now to FIGS. 8 and 9, schematically depicted therein is a further cold form flaring tool in accordance with the invention which is similar to the tool described above relative to FIGS. 1-7, with the differences being the support and orientation of expanding mandrels 125. In particular, the tool of FIGS. 8 and 9 includes first and second pivotally connected levers 111, which include handles 21 and jaws 123. The handles 21 are substantially similar to the handles 21 of the tool of FIGS. 1-7, and corresponding elements thereof are identified by corresponding reference numerals. The jaws 123 include proximal sections 123a that support mandrels 125 at the ends thereof. The half mandrels 125 are configured similarly to the half mandrels 25 of the tool of FIGS. 1-7, and can be formed integrally with the levers 111. The half mandrels include shoulders 125a and mandrel tips 125b, each mandrel tip being a half conical frustum. The half mandrels 125 have a centerline that is perpendicular to the pivot axis PA of the levers 111 and parallel to, or colinear with, the longitudinal axis of the tool.

The cold form flaring tool of the FIGS. 8-9 functions similarly to the tool of FIGS. 1-7. With the tool closed, the mandrel tips are inserted in a tubing end. The tool is expanded by pivotally displacing the grip sections 21b toward each other, and the mandrel tips 125b move outwardly from the longitudinal axis of the tool. As a result of orienting the mandrel tips with their centerline MC perpendicular to the pivot axis PA, the ends of the mandrel tips 125b move outwardly at a greater rate than the bases of the tips adjacent the shoulders. Thus, as the tool expands, each of the furthest apart or distal surfaces of the mandrel tips changes its angle θ relative to a reference line R that is parallel to the centerline of the mandrel tips 125b and passes through the intersection of the mandrel tip and the shoulder. In particular, each distal surface moves from one side of the reference line to the other side of the reference line. If the angle θ is considered positive when the distal surface is between the centerline of the half mandrels and the reference line, expansion of the mandrel tips 125b causes the angle θ to become zero (distal surface is parallel to the reference line R), and then negative wherein the transverse distal surface is on the side of the reference line R away from the centerline of the half mandrels.

Viewed another way, when the tool is unexpanded, the distal surfaces of the mandrel tips 125b converge toward each other in the direction away from the mandrel shoulder 125a. As the tool is expanded, the distal surfaces transition from converging to diverging, in the direction away from the mandrel shoulder.

The diverging expansion of the mandrel tips, wherein the tip ends move outwardly at a greater rate than the tip bases, causes the formation of outwardly extending recesses on the inside wall of the tubing, which retain the mandrel tips in the tubing as the tool is further expanded to expand the tubing end, although the tubing will move slightly off the mandrel shoulders. Essentially, the tips of the mandrels grip the inside wall of the tubing, which prevents the mandrel tips from being squeezed out of the tubing by the resistance of the tubing walls to the expanding forces being applied by the mandrel tips.

Figure 10:
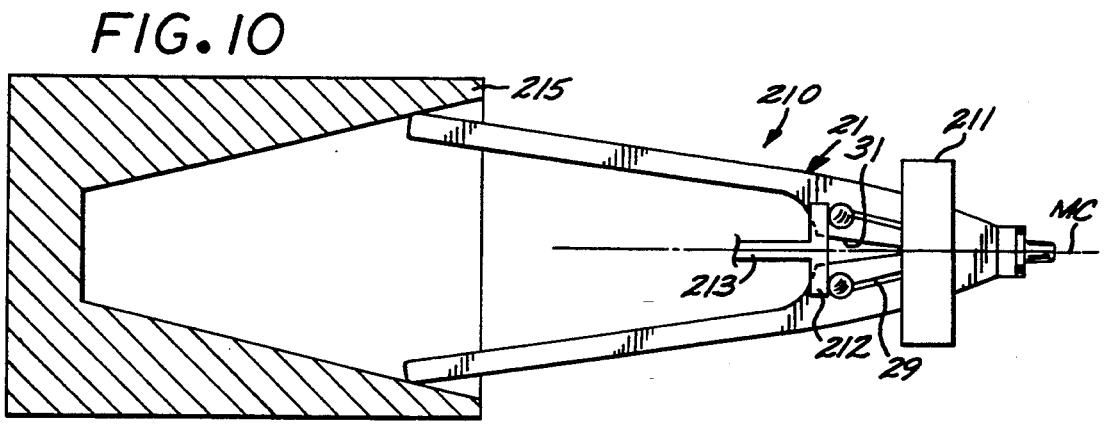
FIG. 10 is a partial sectional plan view of a cold form flaring system in accordance with the invention.

Referring now to FIG. 10, schematically depicted therein by way of illustrative example is an automated cold form flaring system in accordance with the invention which includes an actuatable flaring tool 210 that is substantially similar to the tool of FIGS. 8 and 9, and which has components with the same reference numerals as the tool of FIGS. 8 and 9. The actuatable flaring tool 210 is attached in a suitable manner to an annular bearing assembly 211 that allows complete actuation of the levers of the tool, as well as rotation of the flaring tool about its longitudinal axis L while preventing displacement of the tool along the longitudinal axis. By way of illustrative example, the portions of the levers adjacent the pivot axis can be spherically shaped and slidably captured in a socket housing that is slidably supported by the bearing assembly 211.

The portions of the handle base sections at the ends of the inside surfaces 31 are slidably engaged in a slotted cross bar 212 located at the end of a drive shaft 213 which is controllably rotated to rotate the flaring tool 210 about its longitudinal axis L. The cross bar 212 and the drive shaft 213 are appropriately slotted to allow the handles of the tool 210 to fully close with the inside edges 31 in abutment.

Figure 11:
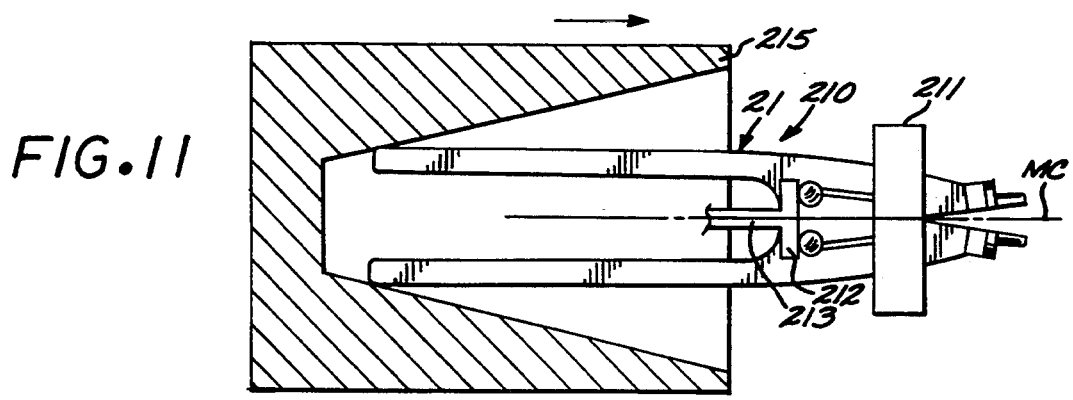
FIG. 11 is a partial sectional plan view of the cold form flaring system of FIG. 10 illustrating the expansion of the mandrel tips pursuant to movement of an actuator.

The flaring tool is expanded by an actuator 215 which includes a conically shaped cavity whose axis is colinear with the longitudinal axis of the flaring tool and which decreases in diameter with distance from the entrance to the cavity. The actuator 215 is movable along the longitudinal axis of the flaring tool 210 and the ends of the handles of the flaring tool 210 are engaged against the diametrically opposite locations on the conically shaped cavity of the actuator. Actuation of the actuator 215 toward the flaring tool, for example with a hydraulic, pneumatic, or electrical actuating means, causes the half mandrels 125 to expand, as shown in FIG. 11, while retraction of the actuator away from the flaring tool allows the half mandrels to the close pursuant to the tension of the torsion spring 29, as shown in FIG. 10.

The automated cold form flaring system is utilized as follows. With the actuator 215 in the retracted position such that the half mandrels are closed, a tubing end is placed over the mandrel tips. While the tubing end is firmly held to prevent rotation thereof, the actuator 215 is actuatated toward to the flaring tool as the drive shaft 213 is rotated. In this manner, the tubing end is being expanded by the expansion and rotation of the flaring tool 210 about its longitudinal axis.

The foregoing has been a disclosure of cold form flaring tools that advantageously provide for outward expansion of tapered mandrel tips wherein the furthest apart or distal surfaces of the expanding mandrel tips form an angle that changes from diverging to converging, in the direction away from the ends of the mandrel tips. When a tool in accordance with the invention is operated with the mandrel tips in a tubing end, the divergingly expanding mandrel tips form outwardly extending recesses on the inside wall of the tubing, which retain the mandrel tips in the tubing as the mandrel tips are further expanded. In this manner, the mandrel tips are not squeezed out of the tubing by the resistance of the tubing walls to the expanding forces being applied by the mandrel tips.

Although the foregoing has been a description and illustration of specific embodiments of the invention, various modifications and changes thereto can be made by persons skilled in the art without departing from the scope and spirit of the invention as defined by the following claims.

What is claimed is:

1. Apparatus for cold form flaring a tubing end, comprising:

first and second pivotally interconnected levers respectively forming first and second handles at one of their ends and first and second jaws on their other ends, wherein said first and second handles are pivotally movable about a pivot axis for opening said jaws when said handles are moved toward each other;

said first and second jaws comprised respectively of (a) first and second flat proximal jaw sections proximal to the pivot axis and (b) first and second flat distal jaw sections respectively attached to said first and second proximal jaw sections and respectively forming an obtuse angle with said first and second flat proximal jaw sections, said first and second flat distal jaw sections respectively having faces that are at more than 180 degrees relative to adjacent faces of said first and second flat proximal jaw sections;

first and second mandrel tips each having the shape of a half conical frustum including a base with a base radius and a narrow end with a radius that is less than the base radius, said first and second mandrel tips together forming a conical frustum when in a closed position, and being respectively supported on the first and second flat distal jaw sections with their bases adjacent the faces of said distal jaw sections that are at more than 180 degrees relative to adjacent faces of said proximal jaw sections and with the mandrel tips in the closed position when said jaws are in a closed position, such that the centerline of the closed mandrel tips forms an acute angle with the pivot axis.

* * * * *